United States Patent [19]
Schuette et al.

[11] Patent Number: 5,935,708
[45] Date of Patent: Aug. 10, 1999

[54] COATED SODIUM PERCARBONATE PARTICLES, PROCESS FOR THE PRODUCTION THEREOF AND USE THEREOF

[75] Inventors: Ruediger Schuette, Alzenau; Martin Bewersdorf, Gelnhausen; Claas-Juergen Klasen, Freigericht, all of Germany

[73] Assignee: Degussa Aktiengesellschaft, Frankfurt am Main, Germany

[21] Appl. No.: 08/755,613

[22] Filed: Nov. 25, 1996

[30] Foreign Application Priority Data

Nov. 28, 1995 [DE] Germany .............................. 195 44 293

[51] Int. Cl.$^6$ .................................. B32B 5/16; C11D 3/10
[52] U.S. Cl. .......................... 428/403; 510/510; 510/534
[58] Field of Search ............................ 428/403; 252/156, 252/174.14; 510/510, 534

[56] References Cited

U.S. PATENT DOCUMENTS

| | | | |
|---|---|---|---|
| 4,105,827 | 8/1978 | Brichard et al. | 428/403 |
| 5,462,804 | 10/1995 | Kokubu et al. | 428/402.24 |
| 5,478,488 | 12/1995 | Doetsch et al. | 252/95 |
| 5,560,896 | 10/1996 | Bewersdorf et al. | 423/415.2 |
| 5,658,873 | 8/1997 | Bertsch-Frank et al. | 510/375 |
| 5,714,201 | 2/1998 | Bewersdorf et al. | 427/213 |
| 5,780,410 | 7/1998 | Baillely et al. | 510/220 |

FOREIGN PATENT DOCUMENTS

| | | |
|---|---|---|
| 0623553 | 11/1994 | European Pat. Off. . |
| 0 634 482 | 1/1995 | European Pat. Off. . |
| 2417572 | 11/1974 | Germany . |
| 2622610 | 12/1976 | Germany . |
| 2733935 | 2/1978 | Germany . |
| 43 15 380 | 11/1994 | Germany . |
| 4315380 | 11/1994 | Germany . |
| 174891 | 1/1922 | United Kingdom . |
| 1300855 | 1/1971 | United Kingdom . |
| 1581465 | 12/1980 | United Kingdom . |

OTHER PUBLICATIONS

WO 95/02555 Jan. 26, 1995.
WO 95/06615 Mar. 9, 1995
WO 95/15291, Jun. 8, 1995.

*Primary Examiner*—Hoa T. Le
*Attorney, Agent, or Firm*—Smith, Gambrell & Russell; Beveridge, DeGrandi, Weilacher & Young Intellectual Property Group

[57] ABSTRACT

In order to increase active oxygen stability, sodium percarbonate is coated with single or multiple layers of various substances. Sodium percarbonate particles consist of a core of sodium percarbonate fluidized bed spray granulate and sodium sulphate, which may be partially hydrated, as the sole constituent of a single coating layer. The particles exhibit both elevated active oxygen stability and very good ensilability. The coating layer is applied by spraying an aqueous $Na_2SO_4$ solution onto the particles to be coated, which were themselves produced by fluidized bed spray granulation, in a fluidized bed and vaporizing water at a fluidized bed temperature of 35 to 100° C.

12 Claims, No Drawings

COATED SODIUM PERCARBONATE PARTICLES, PROCESS FOR THE PRODUCTION THEREOF AND USE THEREOF

INTRODUCTION AND BACKGROUND

The present invention relates to sodium percarbonate particles having a single-layer coating comprising a core substantially consisting of sodium percarbonate and a coating layer enclosing the core and firmly adhering thereto. Despite the use of a single coating material, the coated sodium percarbonate particles are distinguished by very good storage and ensiling properties. The invention moreover relates to the use of the coated sodium percarbonate particles in detergents, cleaning agents and bleaches.

Sodium percarbonate ($2\ Na_2CO_3 \cdot 3\ H_2O_2$) is used as an active oxygen component in detergents, bleaches and cleaning agents. Due to the unsatisfactory storage stability of the sodium percarbonate in warm/moist surroundings and in the presence of certain detergent and cleaning agent components, sodium percarbonate must be stabilized against the loss of active oxygen (Oa). An essential principle of stabilization involves encasing the sodium percarbonate particles in a coating of components having a stabilizing action.

GB patent 174 891 teaches the stabilization of compounds decomposable by the action of weather or catalysts by coating the compounds. Coating of the compounds is achieved by spraying a coating component in liquid form onto the pulverulent material to be stabilized, which is maintained in motion; in order to avoid liquefaction or caking, the material is cooled or dried by means of a stream of air. Per compounds, such as sodium percarbonate, may be coated with water glass using this process. In the case of sodium percarbonate, it is not possible to achieve adequate stabilization with a layer of water glass alone. In connection with coating soda containing water of crystallization, this document also mentions Glauber's salt, namely sodium sulphate decahydrate, as a possible coating component. This document does not make it obvious to coat sodium percarbonate with a layer substantially consisting of sodium sulphate, which is not present in the form of the hydrates thereof or only partially so.

DE-OS 24 17 572 (corresponding to U.S. Pat. No. 4,105,827) discloses a coated sodium percarbonate, wherein the coating substance is a mixed compound formed by crystallization of sodium carbonate or bicarbonate with sodium sulphate. According to DE patent 26 22 610, also corresponding to U.S. Pat. No. 4,105,827, apart from sodium sulphate and sodium carbonate, the single-layer coating additionally contains a sodium silicate. In both processes described in the above-stated documents, an aqueous solution of the constituents of the coating material is sprayed onto sodium percarbonate particles in a fluidized bed, while maintaining a fluidized bed temperature of between 30 and 80° C., wherein a solid coating is formed by vaporization of the introduced water. Despite distinctly improved stability of the sodium percarbonate particles coated in this manner, the active oxygen content still decreases excessively in the event of extended storage in the presence of a detergent powder. It has additionally been found that coated sodium percarbonate particles having a coating, the outermost layer of which consists of soda alone or as the main component of a mixture, exhibit unsatisfactory ensilability in that beds of such products consolidate over extended periods of storage and thus exhibit poor flow behavior and make handling more difficult.

By way of comparison, sodium percarbonate was also coated with soda alone and with sodium sulphate alone using the process of DE-OS 24 17 572. According to Table IV of this document, the resultant coated products exhibit substantially lower stability in moist/warm storage than products which contain in the coating both sodium sulphate and sodium carbonate in the form of a mixed compound. Even though DE-OS 24 17 572 does not state how the sodium percarbonate to be coated was produced, it may be assumed that the sodium percarbonate was obtained by a crystallization process known as of the filing date because production by the technique of fluidized bed spray granulation only subsequently became known.

According to DE-OS 43 15 380, corresponding to U.S. Pat. No. 5,478,488 the coating material of a coated sodium percarbonate consists of a mineral salt mixture substantially consisting of alkali metal sulphate and alkali metal chloride. Although such coated products exhibit satisfactory active oxygen stability and, provided that no alkali metal silicate is additionally present, also an elevated dissolution rate, they are considered disadvantageous due to their content of alkali metal chloride and the associated corrosion hazard. There is no indication in this document of using sodium sulphate as the sole coating material.

According to U.S. Pat. No. 4,325,933, the hygroscopic nature of sodium percarbonate may be reduced and stability increased with a coating of magnesium salts, in particular magnesium sulphate. However, a coating containing solely magnesium salts no longer fulfills current requirements for active oxygen stability. Thus WO 95/02555 (Australian 94 66479) and EP-A 0 623 553 (U.S. Pat. No. 5,462,804) relate to coated sodium percarbonate particles, the coating of which additionally contains, apart from magnesium sulphate and a silicate, soda or an alkali metal salt which can be in the form of carbonates, bicarbonates and sulphates. While a single- or multi-layer coating does indeed give rise to very good active oxygen stability, the necessity of using three different coating components is disadvantageous. Moreover, products having a multi-layer structure and soda in the outermost coating layer have a tendency to cake.

WO 95/15291 (Australian 95 10689) discloses a process for the production of sodium percarbonate particles having improved stability. In this process, sodium percarbonate is brought into contact with a gas having an elevated $CO_2$ content and moisture, in order to form a continuous sodium bicarbonate layer on the sodium percarbonate particles. A layer of sodium sulphate may additionally be applied onto the sodium bicarbonate layer. The process is performed in a fluidized bed coating apparatus.

SUMMARY OF THE INVENTION

An object of the present invention is to provide coated sodium percarbonate particles which, despite having only a single coating component, exhibit very good active oxygen stability in detergents, bleaches and cleaning agents together with good ensilability.

In attaining the above and other objects of the invention, applicants have discovered a process for producing coated sodium percarbonate particles comprising a core substantially consisting of sodium percarbonate and a coating layer enclosing this core and firmly adhering thereto substantially consisting of sodium sulphate, which may be partially hydrated. The coated sodium percarbonate particles have a core consisting of sodium percarbonate produced by fluidized bed spray granulation. The coating layer is obtainable by spraying an aqueous sodium sulphate solution onto the uncoated particles of the sodium percarbonate fluidized bed spray granulate located in the fluidized bed and by evaporating water while maintaining a fluidized bed temperature of 35 to 100° C.

The core of the coated sodium percarbonate particles substantially consists of sodium percarbonate, which has been produced by fluidized bed spray granulation, wherein a hydrogen peroxide solution and a soda solution are sprayed in a fluidized bed apparatus onto nuclei of sodium percarbonate or nuclei of other organic or inorganic substances and water is simultaneously vaporized. With regard to the production of the core substantially consisting of sodium percarbonate by fluidized bed spray granulation processes, reference is made by way of example to DE-OS 27 33 935 (British 1,581,465) and to WO 95/06615. The term "substantially" is taken to mean that, as a result of the production process, the core may contain small quantities of auxiliary substances, i.e. substances other than sodium percarbonate. The auxiliary substances are conventionally present in a quantity of less than 20 wt. % and in particular of less than 10 wt. %, relative to the core. The auxiliary substances are in particular active oxygen stabilizers, such as for example silicates and/or magnesium compounds. Another class of auxiliary substances comprises inorganic or organic compounds which are used as nuclei in fluidized bed spray granulation for the production of sodium percarbonate, for example soda and other substances as are already used in conventional detergents and cleaning agents.

DETAILED DESCRIPTION OF INVENTION

According to the invention, the coating layer substantially consists of sodium sulphate, which may be partially hydrated.

The coating layer is preferably produced by means of a fluidized bed spray granulation process.

As is known, sodium sulphate forms various hydrates, in particular the decahydrate. In order that a good stabilizing action may be achieved, efforts are made during production to obtain a product having the lowest possible degree of hydration. For this reason, the fluidized bed temperature during application of the coating layer is maintained above the transition temperature of the decahydrate (32.4° C.).

The weight of the single-layer coating on the core substantially consisting of sodium percarbonate is usually between 0.5 and 25 wt. %, calculated without hydrate, relative to the sodium percarbonate. The entire quantity of coating preferably amounts to 1 to 15 wt. %, in particular 2 to 10 wt. %, in each case calculated without hydrate and relative to sodium percarbonate.

As is clear from the Examples and Comparative Examples, selection of the material(s) in the outermost layer of the coating has a substantial influence on active oxygen stability and caking behavior and consequently on ensilability.

As disclosed by DE-OS 24 17 572, sodium sulphate has not hitherto been taken into consideration as a sufficiently effective sole coating component for sodium percarbonate. When developing sodium percarbonate having improved active oxygen stability, it was considered necessary to use sodium sulphate in the form of mixed salts or as a constituent of a multi-substance composition. It was thus surprising that very good active oxygen stability accompanied by excellent ensilability may be achieved by using a core of sodium percarbonate fluidized bed spray granulate and sodium sulphate as the sole constituent of the coating layer. While, for example, coated sodium percarbonate particles having soda in the outermost layer of the coating tend to cake during storage, this caking may be avoided if the outermost layer of the coating consists of sodium sulphate, which may be partially hydrated. Thanks to the good ensilability of the sodium percarbonate particles according to the invention, there is no agglomeration and thus no disruption of emptying or arching in the silos, nor handling or dispensing problems with large and small containers.

As already mentioned, the sodium percarbonate particles coated according to the invention may be produced by coating in the fluidized bed. The process for applying a coating onto sodium percarbonate by spraying an aqueous solution containing a coating component on uncoated sodium percarbonate particles located in a fluidized bed is known per se, reference is made by way of example to EP-A 0 623 553, WO 95/02555, U.S. Pat. No. 4,325,933 and DE-PS 26 22 610, in which the process for fluidized bed coating is thoroughly described, but the sole use of sodium sulphate to produce an outermost coating layer is neither disclosed nor rendered obvious. A fluidized bed is formed using air as the fluidization and drying gas and uncoated sodium percarbonate according to the invention. The $Na_2SO_4$ solution to be sprayed preferably has a sodium sulphate content of between 10 and 30 wt. %. This solution is sprayed by means of one or more spray nozzles onto the particles in the fluidized bed. The equipment used may be any suitable equipment known in the art. Spraying preferably proceeds at a fluidized bed temperature of 50 to 80° C. The air used for fluidization and drying conventionally has a temperature of between 50 and 200° C., in particular from 80 to 120° C. The coating layer may be applied in conventional apparatus for fluidized bed spray granulation, for example in substantially round fluidized bed apparatus or in a flow channel. During or after application of the outermost layer of the coating, the material located in the fluidized bed or discharged therefrom may be subjected to a conventional classification process. The average particle diameter and the particle size range of the particles to be coated is selected in such a manner that the coated product according to the invention satisfies applicational requirements (a coarse material is often preferred with regard to elevated Oa stability, while a finer material is preferred with regard to a short dissolution time).

The sodium percarbonate particles coated according to the invention may be used as a bleaching component in detergents, cleaning agents, bleaches and disinfectants. In addition to conventional cleansers and scouring agents, the stated cleaning agents also include dishwashing detergents and denture cleansers. Such detergent, cleaning agent, bleach and disinfectant compositions are distinguished by the fact that the coated sodium percarbonate contained therein has unexpectedly high storage stability in the presence of conventional constituents, such as in particular zeolites, such that only very slow loss of active oxygen occurs during conventional storage of such compositions. The detergents, cleaning agents, bleaches and disinfectants consist of 1 to 99 wt. % of the sodium percarbonate particles coated according to the invention or of a mixture of these and other active oxygen bleaches and, for the remainder to 100 wt. %, of other conventional components of such agents. These components in particular include:

1. surface-active agents from the range of cationic, anionic, nonionic, amphoteric or ampholytic surface-active agents.
2. inorganic and/or organic builders, the principal action of which is to sequester or complex the metal ions responsible for water hardness, for example zeolites, phyllosilicates, polyphosphates, aminopolyacetic acids and aminopolyphosphonic acids as well as polyoxycarboxylic acids.

3. components having an alkaline action, such as alkanolamines, and inorganic electrolytes, such as silicates, carbonates and sulphates.

4. bleaching activators from the series of N-acyl compounds and O-acyl compounds, such as tetraacetylethylenediamine (TAED) and nonanoyl-oxybenzene sulphonate (NOBS).

5. further constituents of the agents may be, stabilizers for peroxides, such as in particular magnesium salts, anti-redeposition agents, optical brighteners, foam inhibitors, enzymes, disinfectants, corrosion inhibitors, fragrances, dyes and agents to control pH. Reference is made by way of example to DE-OS 33 21 082, pages 14–30 with regard to individual compounds falling within classes 1 to 5.

EXAMPLES a) General instructions for the application of a sodium sulphate coating on coated or uncoated sodium percarbonate in a fluidized bed:

A fluidized bed is created with the sodium percarbonate (NaPc) to be coated using drying air (air feed temperature 100 to 110° C.) in a laboratory fluidized bed dryer; the fluidized bed is maintained during coating. The particles present in the fluidized bed are sprayed with a 20 wt. % aqueous sodium sulphate solution, wherein the fluidized bed temperature is maintained in the range from 50 to 60° C.; post-drying is performed at 80 to 90° C. The solution is sprayed using conventional two-fluid nozzles with air as the propellant. The quantities of coating stated in the Examples are weight percentages and relate in each case to the sodium percarbonate used.

The single- or two-layer coated products not according to the invention were produced in a similar manner, wherein, however, one or two aqueous solutions containing coating components were sprayed onto the sodium percarbonate core.

b) Determination of storage stability of coated sodium percarbonate particles according to the invention and produced for comparison purposes in detergent formulations (=Oa retention (%)):

A phosphate-free detergent powder containing zeolite, activator TAED and a coated or uncoated sodium percarbonate (NaPc) are mixed together in quantities such that the mixture contains 5% TAED and the Oa content is approximately 2.35 wt. %.

Constituents of the detergent powder in wt. %:

| | |
|---|---|
| anionic surfactants | 12 |
| nonionic surfactants | 8 |
| zeolite A | 36 |
| soda | 10 |
| Na silicates | 3 |
| remainder (incl. moisture) | 31. |

800 g of each mixture are stored at 30° C. and 80% relative humidity in a conditioning cabinet in conventional commercial adhesively sealed E1 detergent packets having a water repellent coating. One packet is stored for each sampling time (after 4 and 8 weeks). Oa content is determined in the usual manner using the permanganate method; Oa retention in % is calculated from the starting Oa content and the Oa content after 4 and 8 weeks.

c) Determination of ensilability:

Ensilability was determined using the Jenike method (*Silo-Handbuch*, Peter Martens (ed.), Ernst & Sohn Verlag, Berlin (1988), pp. 41–56) over a period of 28 days. Product was stored largely with the exclusion of air at room temperature in sealed measuring cells of the time consolidating bench. Tests were performed in the Jenike measurement cell (diameter: 92 mm) with a suspended weight H=251 g plus 1, 2 and 4 kg as the standard initial shear stress. For time consolidation purposes, product samples were exposed to an initial shear load of H+2 kg and final shear load of H+1 kg. Load during storage in the time consolidating bench 4.5 kg.

In the Jenike method, consolidation stress $\sigma_1$ [Pa] and bulk material strength fc [Pa] are determined as a function of storage time. The ffc value is determined as a measure of the flowability of bulk materials using the equation:

$$ffc = \frac{\delta_1}{fc}$$

The results are rated as follows:

| | |
|---|---|
| ffc > 10 | free flowing |
| ffc 10–4 | ready flowing |
| ffc 4–2 | cohesive |
| ffc < 2 | very cohesive, non-flowing. |

The sodium carbonate coated was, on the one hand, that produced by fluidized bed spray granulation according to WO 95/06615 (see VB 1 in Table 1) and, on the other hand, conventional commercial sodium percarbonate produced by crystallization from an aqueous solution containing NaCl (see VB 6 in Table 2).

Example B 1 and Comparative Examples VB 1 to VB 8

The products were produced in accordance with the general instructions. Table 1 shows the Oa contents. The total moisture content of the coated products, determined by drying loss at 160° C. minus Oa content, was between 0.8 and 1.2%. Particle size range of the NaPc fluidized bed granulate: up to 0.5 mm 27%, up to 0.6 mm 40%, up to 0.7 mm 14%, up to 0.8 mm 16%, up to 1 mm 3%.

It may be seen from Table 1 that sodium percarbonate coated according to the invention with $Na_2SO_4$ as the sole coating (B 1) and two-layer coated NaPc with $Na_2SO_4$ as the outermost layer of a coating (VB 4) exhibit both elevated Oa retention in the detergent formulation and good ensilability, namely "ready flowing" from the first day of storage; thereafter, there is no further change in flowability. Sodium percarbonate particles having an outermost layer substantially containing soda (VB 2 and VB 3) consolidate during storage, they are classed as cohesive to very cohesive. It may be concluded from Example B 1 that a single-layer coating of an NaPc fluidized bed spray granulate with $Na_2SO_4$ gives rise to Oa retention which is substantially identical to that achieved with a single-layer (VB 5) or two-layer (VB 4 and VB 3) coating containing $Na_2SO_4$ and $Na_2CO_3$.

By way of comparison, Table 2 shows results for products not according to the invention, in which the core was in all cases a crystallized NaPc. The active oxygen stability of an uncoated crystallized NaPc (VB 6) is lower than that of an NaPC fluidized bed spray granulate (VB 1). While coating with $Na_2SO_4$ (VB 7 and VB 8) does indeed increase Oa retention in the detergent formulation and there is no tendency to cake, the Oa retention is entirely inadequate for practical purposes.

Further variations and modifications of the foregoing will be apparent to those skilled in the art and are intended to be encompassed by the claims appended hereto.

German priority application 195 44 293.8 is relied on and incorporated herein by reference.

TABLE 1

| Example (B) no. or Comparative Example (VB) no. | NaPc core | NaPc coating (material/wt.) | Oa content (%) | Oa retention (%) in detergent after 4 weeks and 8 weeks | | Jenike ffc values as a function of storage time | | | |
|---|---|---|---|---|---|---|---|---|---|
| | | | | | | Start | 1 day | 7 days | 28 days |
| VB 1 | Fluidized bed spray granulate | — | 14.2 | 52 | 25 | n.d. | n.d. | n.d. | n.d. |
| VB 2 | Fluidized bed spray granulate | Na$_2$CO$_3$/5 | 13.5 | 56 | 34 | | | | |
| B 1 | Fluidized bed spray granulate | Na$_2$SO$_4$/5 | 13.5 | 95 | 88 | ∞ | 7.9 | 7.9 | 7.9 |
| VB 3 | Fluidized bed spray granulate | 1. Na$_2$SO$_4$/2.5 2. Na$_2$CO$_3$/2.5 | 13.6 | 92 | 89 | ∞ | 38 | 1.5 | 0.6 |
| VB 4 | Fluidized bed spray granulate | 1. Na$_2$CO$_3$/2.5 2. Na$_2$SO$_4$/2.5 | 13.5 | 93 | 87 | 26.1 | 6.9 | 6.9 | 6.9 |
| VB 5 | Fluidized bed spray granulate | Mixture of Na$_2$CO$_3$ and Na$_2$SO$_4$(1:1 parts by weight)/5 | 13.6 | 95 | 86 | n.d. | n.d. | n.d. | n.d. |

NaPc = sodium percarbonate; n.d. = not determined

TABLE 2

| Example (B) no. or Comparative Example (VB) | NaPc core | NaPc coating (material/wt. %) | Oa retention (%) in detergent after 4 weeks | Tendency to cake*) |
|---|---|---|---|---|
| VB 6 | Crystallized product | — | 30 | |
| VB 7 | Crystallized product | Na$_2$SO$_4$/5 | 50 | none |
| VB 8 | Crystallized product | Na$_2$SO$_4$/10 | 70 | none |

*)qualitative rating: none - slight - moderate - severe (agglomeration when poured out of test flask after 10 days' storage in a sealed flask

We claim:

1. A coated sodium percarbonate particle comprising a core substantially consisting of sodium percarbonate and a coating layer enclosing said core and firmly adhering thereto, said coating substantially consisting of sodium sulphate as the sole coating component for active oxygen stability, which may be partially hydrated, said core having been produced by fluidized bed spray granulation and said coating layer having been obtained by spraying an aqueous sodium sulphate solution onto the uncoated particles of the sodium percarbonate fluidized bed spray granulate located in the fluidized bed and evaporating water while maintaining a fluidized bed temperature of 35 to 100° C.

2. The coated sodium percarbonate particle according to claim 1, wherein said coating layer amounts to 0.5 to 25 wt. % of sodium sulphate, calculated without hydrate and relative to sodium percarbonate.

3. The coated sodium percarbonate particle according to claim 2, wherein said coating layer amounts to 2 to 10 wt. % of sodium sulphate, calculated without hydrate and relative to sodium percarbonate.

4. The coated sodium percarbonate particle according to claim 1 wherein said core contains less than 20% by weight of the core of an active oxygen stabilizer.

5. The coated sodium percarbonate particle according to claim 4 wherein said stabilizer is a silicate or magnesium compound.

6. The coated sodium percarbonate particle according to claim 4 wherein said stabilizer is present in an amount of less than 10% by weight of said core.

7. A process for the production of a coated sodium percarbonate particle according to claim 1, comprising spraying an aqueous sodium sulphate solution containing sodium sulphate as the sole coating component for active oxygen stability onto particles of the sodium percarbonate fluidized bed granulate located in a fluidized bed while maintaining a fluidized bed temperature of 35 to 100° C. and vaporizing water.

8. The process according to claim 7, wherein a 10 to 30 wt. % sodium sulphate solution is sprayed.

9. The process according to claim 7 wherein spraying is performed at a fluidized bed temperature of 50 to 80° C.

10. A detergent composition containing the coated sodium percarbonate particle of claim 1.

11. A cleaning agent composition containing the coated sodium percarbonate particle of claim 1.

12. A bleach composition containing the coated sodium percarbonate particle of claim 1.

* * * * *